(12) United States Patent
Hung et al.

(10) Patent No.: US 8,649,511 B2
(45) Date of Patent: Feb. 11, 2014

(54) METHOD AND PROCESSING CIRCUIT FOR DEALING WITH GALOIS FIELD COMPUTATION

(75) Inventors: Chia-Yu Hung, Taipei (TW); Tsung-Li Yeh, Peng-Hu Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 298 days.

(21) Appl. No.: 12/820,148

(22) Filed: Jun. 22, 2010

(65) Prior Publication Data

US 2010/0322412 A1 Dec. 23, 2010

(30) Foreign Application Priority Data

Jun. 22, 2009 (TW) ................................. 98120826 A (51) Int. Cl.
*H04K 1/00* (2006.01)
(52) U.S. Cl.
USPC .......................................................... 380/28
(58) Field of Classification Search
USPC .................................... 380/28, 255; 708/492
See application file for complete search history.

(56) References Cited

U.S. PATENT DOCUMENTS

| | | | |
|---|---|---|---|
| 5,227,992 A | 7/1993 | Lee | |
| 5,818,744 A * | 10/1998 | Miller et al. | ................... 708/654 |
| 6,389,442 B1 | 5/2002 | Yin | |
| 6,766,344 B2 | 7/2004 | Dubey | |
| 7,031,468 B2 * | 4/2006 | Hoffstein et al. | ................ 380/28 |
| 7,236,593 B2 | 6/2007 | Lu | |
| 7,526,518 B2 * | 4/2009 | Zhang et al. | ................... 708/492 |
| 7,984,361 B2 * | 7/2011 | Ito | .................................. 714/770 |
| 8,111,826 B2 * | 2/2012 | Takashima | ....................... 380/28 |
| 8,131,794 B2 * | 3/2012 | Ito | .................................. 708/492 |
| 2005/0058285 A1 | 3/2005 | Stein | |
| 2005/0169463 A1 | 8/2005 | Ahn | |
| 2006/0002548 A1 | 1/2006 | Chu | |
| 2006/0093136 A1 | 5/2006 | Zhang | |
| 2006/0109981 A1 | 5/2006 | Sexton | |

OTHER PUBLICATIONS

Ke Li, A Reconfigurable and Scalable Efficient Architecture for AES, 2008, Thesis submitted to the school of graduate studies of the university of Lethbridge, https ://www.uleth.ca/dspace/bitstream/handle/10133/77 8/li,%20ke.pdf?sequence= 1.*
Ke Li, A Reconfigurable and Scalable Efficient Architecture for AES, 2008, Thesis submitted to the school of graduate studies of the university of Lethbridge, https ://www.uleth.ca/dspace/bitstream/handle/10133/77 8/li,%20ke.pdf?sequence= 1.*
Ke Li, A Reconfigurable and Scalable Efficient Architecture for AES, 2008, Thesis submitted to the school of graduate studies of the university of Lethbridge, https://www.uleth.ca/dspace/bitstream/handle/10133/778/li,%20ke.pdf?sequence=1.*

(Continued)

*Primary Examiner* — William Powers
*Assistant Examiner* — Abiy Getachew
(74) *Attorney, Agent, or Firm* — McClure, Qualey & Rodak, LLP (57) ABSTRACT

A method for dealing with Galois Field computation includes: providing an operating circuit which has at least a multiplicative inverse unit; and using the multiplicative inverse unit to execute at least a plurality of isomorphism maps for deriving a multiplicative inverse at a specific Galois Field corresponding to an input data, wherein the plurality of isomorphism maps include at least a change of basis.

19 Claims, 7 Drawing Sheets

(56) References Cited

OTHER PUBLICATIONS

Joachim von zur Gathen, Amin Shokrollahi, and Jamshid Shokrollahi (2007), Efficient multiplication using type 2 optimal normal bases, Workshop on the Arithmetic of Finite Fields, WAIFI 2007, Claude Carlet & Berk Sunar, editors, No. 4547 in Lecture Notes in Computer Science, 55-68. Springer-Verlag, Berlin/ Heidelberg. ISSN 0302-9743.*
Gerard P. Michon, Ph.D., Fields (and Skew Fields), (Mar. 16, 2006).*
Adnan Abdul-Aziz Gutub1, Alexandre F. Tenca, Erkay Sava 2, and çetin K. Koç, Scalable and Unified Hardware to Compute Montgomery Inverse in GF(p) and GF(2n) and Akashi Satoh, Sumio Morioka, Kohji Takano, and Seiji Munetoh, A compact Rijndael Hardware Architecture with S-Box Optimization, Asiacrypt 2001, LNCS 2248, pp. 239-254, 2001.*
[Akashi Satoh], [A Compact Rijndael Hardware Architecture with S-Box Optimization], [2001], [p. 239~254], [Asiacrypt 2001 LNCS 2248], [Springer-Verlag Berlin Heidelberg 2001], [Berlin Heidelberg ].
[Toshiya Itoh], [A fast algorithm for computing multiplicative inverses in GF(2m) using normal bases], [1988], [p. 171~177][Academic Press], [Japan].
[Johannes Wolkerstorfer], [An ASIC Implementation of the AES SBoxes], [2002], [p. 67~78], [CT-RSA 2002,LNCS 2271], [Springer-Verlag Berlin Heidelberg ], [Berlin Heidelberg ].
[Adam D. Woodbury], [Efficient Algorithms for Elliptic Curve Cryptosystems on Embedded Systems], [Sep. 2001].
[Atri Rudra], [Efficient Rijndael Encryption Implementation with Composite Field Arithmetic], [CHES 2001, LNCS 2162], [2001], [p. 171-184], [Springer-Verlag Berlin Heidelberg 2001], [Berlin Heidelberg ].
[Advanced Encryption Standard (AES)], [Nov. 26, 2001], [Federal Information Processing Standards Publication 197].
[B. Sunar], [Low-Complexity Bit-Parallel Canonical and Normal Basis Multipliers for a Class of Finite Fields], [1998 IEEE International Symposium on InformationTheory], [Aug. 16, 1998], [p. 294].
[C. Paar], [Efficient VLSI Architectures for Bit Parallel Computation in Galois Fields], [1994], [University Essen].
[Vincent Rijmen], [Efficient implementation of the Rijndael S-box], [2000].

* cited by examiner

| Multiplicative inverse at GF($2^8$) | | Encryption | | | Decryption | | | Encryption/Decryption | | |
|---|---|---|---|---|---|---|---|---|---|---|
| $\log_r(\lambda)$ | $W(T_{poly}^{comp})+w(TST)$ $+w(T_{comp}^{poly})+4w(\rho)$ | $\log_r(\lambda)$ | $W(T_{poly}^{comp})+w(TST)$ $+w(FT_{comp}^{poly})+4w(\rho)$ | $\log_r(\rho)$ Weight | $\log_r(\lambda)$ | $W(T_{poly}^{comp}F^{-1})+w(TST)$ $+w(T_{comp}^{poly})+4w(\rho)$ | $\log_r(\rho)$ Weight | $\log_r(\lambda)$ | $W(T_{poly}^{comp}F^{-1})+w(TST)$ $+w(FT_{comp}^{poly})+4w(\rho)$ | $\log_r(\rho)$ Weight |
| 14 | 82 | 14 | 1 | 78 | 10 | 1 | 79 | 5 | 1 | 78 |
| 13 | 82 | 13 | 2 | 78 | 5 | 2 | 79 | 10 | 2 | 78 |
| 11 | 82 | 11 | 4 | 78 | 10 | 4 | 79 | 5 | 4 | 78 |
| 7 | 82 | 7 | 8 | 78 | 5 | 8 | 79 | 10 | 8 | 78 |
| 8 | 83 | 11 | 1 | 79 | 0 | 7 | 82 | 5 | 7 | 79 |
| $-\infty$ | 83 | $-7$ | 2 | 79 | 0 | 11 | 82 | 10 | 11 | 79 |
| 3 | 83 | 14 | 4 | 79 | 0 | 13 | 82 | 5 | 13 | 79 |
| $-\infty$ | 83 | 13 | 8 | 79 | 0 | 14 | 82 | 10 | 14 | 79 |
| 2 | 83 | 5 | 7 | 81 | 5 | 7 | 83 | 10 | 1 | 81 |
| $-\infty$ | 83 | 8 | 11 | 81 | 10 | 11 | 83 | 5 | 2 | 81 |
| 1 | 83 | 4 | 11 | 81 | 5 | 13 | 83 | 10 | 4 | 81 |
| $-\infty$ | 83 | 10 | 13 | 81 | 10 | 14 | 83 | 5 | 8 | 81 |
| 5 | 85 | 2 | 13 | 81 | 5 | 1 | 84 | 0 | 7 | 86 |
| 10 | 85 | 5 | 14 | 81 | 10 | 2 | 84 | 0 | 11 | 86 |
| 5 | 85 | 1 | 14 | 81 | 5 | 4 | 84 | 0 | 13 | 86 |

FIG. 7

METHOD AND PROCESSING CIRCUIT FOR DEALING WITH GALOIS FIELD COMPUTATION

BACKGROUND OF THE INVENTION

1. Field of the Invention

The present invention relates to Galois Field computation, and more particularly, to a SubByte circuit and an InvSubByte circuit applied in an advanced encryption standard (AES) system, and a method thereof.

2. Description of the Prior Art

Advanced Encryption Standards (AES) is an encryption standard approbated by the Federal Information Processing Standards (FIPS) wherein, in A.D. 2000, the National Institute of Standards and Technology (NIST) adopted a Rijndael algorithm to realize the AES system. AES is provided for protecting the privacy of electric data, and the Rijndael algorithm is a commensurate encryption/decryption standard, which can be applied for both encrypting electric data to derive a corresponding ciphertext, and for decrypting the ciphertext into the original plaintext (i.e., the electric data); in this way, the privacy of the electric data is further ensured. In the AES process, the used cryptographic key can be selectively 128 bits, 192 bits, or 256 bits to encrypt/decrypt a 128 bit data block.

The encryption process of AES includes several operations while the decryption process of AES includes several inverse operations corresponding to the operations applied in the encryption process. The operations of the encryption/decryption process include: AddRoundKey operations, SubByte operations/InvSubByte (inverse SubByte) operations, ShiftRow operations/InvShiftRow (Inverse ShiftRow) operations and MixColumn/InvMixColumn (inverse MixColumn) operations. The AES process encrypts/decrypts the electric data by executing a plurality of the above-mentioned operations repeatedly. There is therefore a demand for providing an efficient and compact operating circuit (for executing the aforementioned encryption operations) and corresponding inverse operating circuit for the decryption operations to reduce the processing time and the circuit area.

In the AES process, the SubByte operation is a nonlinear operation, wherein each input byte needs an individual S-Box for executing the corresponding operation. The operations of the S-Box and the operations of the inverse S-Box both include a multiplicative inverse operation, and an affine transform/inverse affine transform; the difference between the S-Box operations and the inverse S-Box operations is merely the applied order of the multiplicative inverse operation and the affine/inverse affine transform. However, executing the S-Box operations and the inverse S-Box operations in the corresponding finite field (Galois Field) is excessively complex due to the fact that the used finite field in AES is a Galois Field $GF(2^8)$; therefore, for avoiding the difficulty of performing complex computation in the Galois Field $GF(2^8)$, a lookup table is used for the process of S-Box and inverse S-Box. The required lookup table is large and needs a huge memory for storage, however, leading to the huge circuit area and a restricted throughput.

There is therefore a demand for providing a novel S-Box structure and the corresponding inverse S-Box structure with an excellent operating efficiency and smaller-size, to solve the existing problems of the AES process.

SUMMARY OF THE INVENTION

It is therefore one of the objectives of the present invention to provide a method for dealing with the Galois Field computation and an apparatus thereof, to reduce the operating complexity by applying a plurality of changes of basis, to reduce the required circuit area and to increase the throughput.

According to an exemplary embodiment of the present invention, a method for dealing with Galois Field computation is provided. The method comprises: providing an operating circuit which has at least a multiplicative inverse unit; and using the multiplicative inverse unit to execute at least a plurality of isomorphism maps for deriving a multiplicative inverse at a specific Galois Field corresponding to an input data, wherein the plurality of isomorphism maps comprise at least a change of basis.

According to another exemplary embodiment of the present invention, an apparatus for dealing with Galois Field computation is provided. The apparatus comprises: a multiplicative inverse unit, for deriving a multiplicative inverse at a specific Galois Field corresponding to an input data, wherein the multiplicative inverse unit executes at least a plurality of isomorphism maps wherein the plurality of isomorphism maps comprise at least a change of basis.

Preferably, the operations for deriving the multiplicative inverse via applying change(s) of basis downgrade the complexity of the Galois Field computation.

Preferably, change(s) of basis and the computation at a composite field are applied for deriving the multiplicative inverse.

Preferably, the required circuit structure is simplified by choosing normal basis (bases) appropriately in the corresponding operations.

Preferably, the factors/coefficients of an irreducible polynomial are finely deliberated for reducing the required circuit area.

Preferably, the factors/coefficients of the irreducible polynomial are chosen by considering an affine transform and transform matrix(s) to compact the required circuit area.

Preferably, a community structure (e.g., a community multiplicative inverse unit) that is able to be used for both the S-Box operations and the inverse S-Box operations is provided which chooses an appropriate irreducible polynomial by considering the affine transform in the S-Box operations, and the inverse affine transform in the inverse S-Box operations to thereby compact the required circuit area of the AES system.

Preferably, a community structure capable of executing both the S-box operations and the inverse S-Box operations is provided by providing an appropriate irreducibly polynomial whose factors/coefficients are chosen according to the linear parts of the affine transform in the S-Box operations and the linear part of the inverse affine transform in the inverse S-Box operations, and a plurality of transform matrixes in the computation of multiplicative inverse, to thereby upgrade the efficiency.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
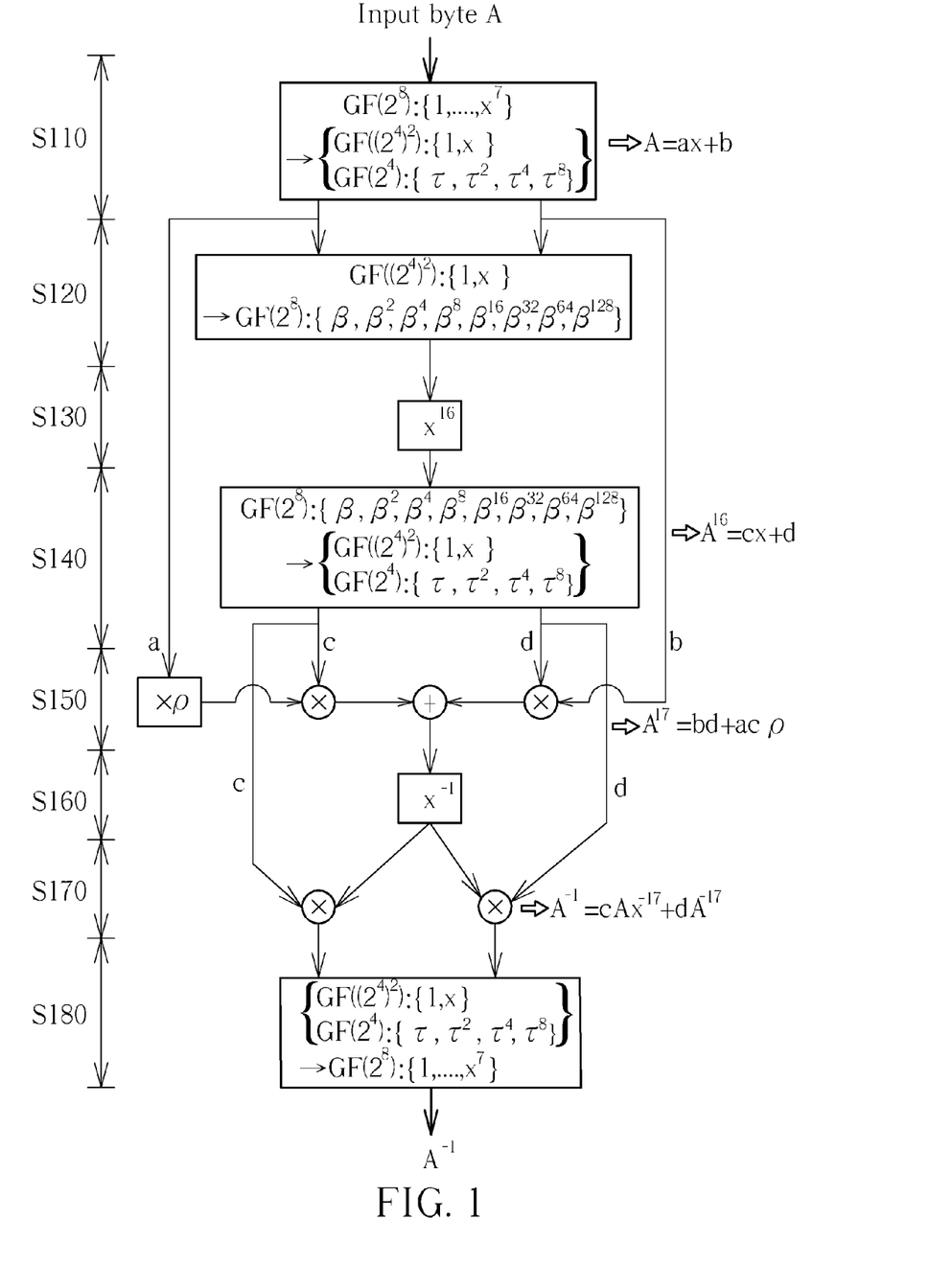
FIG. 1 is a flowchart illustrating an exemplary embodiment for deriving a multiplicative inverse at a Galois Field GF $(2^8)$ corresponding to an input data according to AES computation of the present invention.

Please refer to FIG. 1. FIG. 1 is a flowchart illustrating an exemplary embodiment of the present invention for deriving a multiplicative inverse at a Galois Field GF ($2^8$) corresponding to an input data (e.g., input byte) according to AES computation. In the flowing descriptions, the Itoh-Tsujii algorithm is applied for simplifying the multiplicative inverse computation at the Galois Field GF($2^8$); the Itoh-Tsujii algorithm is described as follows:

| Input A: $A \in GF(q^m)$, Output $A^{-1}$: $A^{-1} \in GF(q^m)$ |
|---|
| 1. $r \leftarrow \frac{q^m - 1}{q - 1}$, where q is a power prime and GF(q) is subfield of GF($q^m$) |
| 2. $B \leftarrow A^{r-1}$ in GF($q^m$) |
| 3. $a \leftarrow A \cdot B = A \cdot A^{r-1} = A^r$ |
| 4. $b \leftarrow a^{-1} = (A^r)^{-1}$ in GF(q) |
| 5. $A^{-1} \leftarrow b \cdot B = (A^r)^{-1} \cdot A^{r-1}$ |

As mentioned above, the operations of the S-Box and of the inverse S-Box are constructed by: 1. executing an affine transform or an inverse transformation upon the input byte A; and 2. deriving a multiplicative inverse at a polynomial basis (i.e., the standard basis) over the Galois Field GF($2^8$) corresponding to the input byte A; the difference between the S-Box operation and the inverse S-Box operation is the executed order of the above computation. Due to the complexity of the circuit structures of S-Box and/or the inverse S-Box being mainly dependent on the Galois Field computation for deriving the multiplicative inverse at the polynomial basis over the Galois Field GF($2^8$), one of the features of the present invention is to reduce the circuit complexity by applying the Itoh-Tsujii algorithm and using a plurality of changes of basis, to convert the computation at the Galois Field GF($2^8$) to a corresponding composite field; furthermore, appropriate normal basis is chosen under the computation process to further ease the required computation to ensure a simplified circuit structure. In this way, a novel apparatus and method for dealing with the Galois Field computation in the AES system is provided to replace the conventional bulky hardware structures of the SubByte operation and the inverse SubByte operation.

Please note that, for the sake of brevity, in the following descriptions of the present invention an exemplary embodiment for deriving a multiplicative inverse at a specified Galois Field GF($2^8$) corresponding to an input byte A is provided, and a corresponding composite field GF($2^4$)$^2$ is used as an example in the operation of the encryption/decryption process. However, with the requirements and application field differences, the method and apparatus of the present invention can also be applied for deriving the multiplicative inverse at other Galois Fields; that is, executing computation via converting the processed data from the Galois Field GF($2^8$) to a composite field GF($2^4$)$^2$ is not meant to be a limitation of the present invention, and the used composite field in the present invention is not be restricted to be the composite field GF($2^4$)$^2$. All the alternative design variations can be easily understood by people with ordinary skills in this art after reading the following description, and all these alternative designs obey and fall within the scope of the present invention.

As shown in FIG. 1, the flowchart of the method for deriving the multiplicative inverse at the polynomial basis over the Galois Field GF($2^8$) according to the input byte A includes the following steps:

Step S110: Execute an isomorphism map for transferring an input byte A from a polynomial basis over a ground field GF(2) to a polynomial basis over a ground field GF($2^4$). In other words, the input byte A over the Galois field GF($2^8$) is isomorphism mapped to over the composite field GF($2^4$)$^2$, wherein the basis of the ground field GF($2^4$) of the composite field GF($2^4$)$^2$ is chosen as ($\tau$, $\tau^2$, $\tau^4$, $\tau^8$).

Step S120: Execute an isomorphism map to transfer the input byte A from the polynomial basis over the ground field GF($2^4$) to a normal basis over the ground field GF(2). That is, the input byte A is isomorphism mapped from over the composite field GF($2^4$)$^2$ to over the Galois Field GF($2^8$), wherein the normal basis of the Galois Field GF($2^8$) is chosen as ($\beta$, $\beta^2$, $\beta^4$, $\beta^8$, $\beta^{16}$, $\beta^{32}$, $\beta^{64}$, $\beta^{128}$).

Step S130: Execute a power operation at the normal basis over the ground field GF(2) to drive a predetermined Mth-order (e.g., $16^{th}$-order) of the input byte A; expressed as $A^{16}$.

Step S140: Execute an isomorphism map to the predetermined Mth-order of the input byte A for transferring $A^{16}$ from the normal basis over the ground field GF(2) to the polynomial basis over the ground field GF($2^4$). In other words, $A^{16}$ is isomorphism mapped from over the Galois Field GF($2^8$) to over the composite field GF($2^4$)$^2$, wherein the ground field GF($2^4$) of the composite field GF($2^4$)$^2$ is chosen as ($\tau$, $\tau^2$, $\tau^4$, $\tau^8$).

Step S150: Derive a product of $A^{16}$ and the input byte A at the polynomial basis of the composite field GF($2^4$)$^2$; that is, derive $A^{17}$ according to the input byte A derived from Step S110 and $A^{16}$ derived from Step S140.

Step S160: Derive a multiplicative inverse of $A^{17}$ at the normal basis ($\tau$, $\tau^2$, $\tau^4$, $\tau^8$) of the ground field GF($2^4$). That is, derive $A^{-17}$.

Step S170: Derive a product of $A^{-17}$ and $A^{16}$ at the polynomial basis of the composite field GF($2^4$)$^2$ to compute $A^{-1}$.

Step S180: Execute an isomorphism map for transferring $A^{-1}$ from the polynomial basis over the ground field GF($2^4$) to the polynomial basis over the ground field GF(2); that is, derive a multiplicative inverse at the polynomial basis over the Galois Field $GF(2^8)$ corresponding to the input byte A.

In this exemplary embodiment, the $(q)^m$ in the above Itoh-Tsujii algorithm is set as $(2^4)^2$. Therefore, in the above flow, the step of deriving the $17^{th}$-order of the input byte A is processed at the composite field $GF(2^4)^2$ rather than executing the product computation at the Galois Field $GF(2^8)$. By isomorphism mapping the data from the Galois Field $GF(2^8)$ to a corresponding composite field $GF(2^4)^2$, and supposing that the input data A is at the polynomial basis over the composite field $GF(2^4)^2$, the input byte A can be expressed as a first order polynomial as follows:

$$A = ax + b \quad (1)$$

Similarly, the 16th-order of the input byte A, A16 at the polynomial basis over the composite field GF(24)2 is represented as follows:

$$A^{16} = cx + d \quad (2)$$

wherein the coefficients a, b, c, d, of the first order polynomial are the elements of the Galois Field $GF(2^4)$. Since the detailed descriptions of the Galois Field, the polynomial basis (standard basis), normal basis (bases) and irreducible polynomials are described at the linear algebra and the error correlation code (ECC) and are well-known by people of ordinary skill in this art, further descriptions are omitted here for the sake of brevity. In addition, since the Galois Field $GF(2^4)$ is a subfield of the composite field $GF(2^4)^2$ the $17^{th}$-order of the input byte A (i.e., $A^{17}$) is at the Galois Field $GF(2^4)^2$ and $A^{17}$ can be proved as a constant polynomial according to corresponding mathematical ratiocinations. The operation and the detailed descriptions of $A^{17}$ are disclosed as follows.

For effectively easing the circuit complexity of the above operation, in an exemplary embodiment of the present invention, for example, in Step S130, the input byte A is isomorphism mapped from the polynomial basis to the normal basis for deriving the 16th-order of the input byte A (i.e., $A^{16}$): $\{\beta^{2^0}, \beta^{2^1}, \beta^{2^2}, \beta^{2^3}, \beta^{2^4}, \beta^{2^5}, \beta^{2^6}, \beta^{2^7}\} = \{\alpha^5, \alpha^{10}, \alpha^{20}, \alpha^{40}, \alpha^{80}, \alpha^{160}, \alpha^{65}, \alpha^{130}\}$, wherein $\alpha$ is a power prime of the Galois Field $GF(2)$. In addition, in the operations of Step S150 for deriving the $17^{th}$-order of the input byte A (i.e., $A^{17}$), the input byte A and $A^{16}$ are transferred to a composite field $GF(2^4)^2$ wherein the corresponding ground field is Galois Field $GF(2^4)$, and the ground field $GF(2^4)$ is represented in the normal basis; furthermore, the applied elements at the normal basis over the Galois Field $GF(2^4)$ in the computation process is represented by $\{\tau^{2^0}, \tau^{2^1}, \tau^{2^2}, \tau^{2^3}\} = \{\gamma^3, \gamma^6, \gamma^{12}, \gamma^9\}$, wherein $\gamma$ is a power prime of the Galois Field $GF(2^4)$. By the aforementioned plurality of changes of basis; a corresponding monic irreducible polynomial is $m(x) = x^2 + \lambda x + \rho$, where different efficient coefficients in the monic irreducible polynomial can be chosen according to the design requirements in different ways. In this way, a circuit cost is reduced while ensuring excellent efficiency of the S-Box/inverse S-Box operations.

Please refer to FIG. 1. In the aforementioned computation flows, both the input byte A and $A^{16}$ are used for deriving $A^{17}$ (in Step S150) by transferring A and $A^{16}$ to the polynomial basis OF the composite field $GF(2^4)^2$, and expressing the corresponding irreducible polynomial as $m(x) = x^2 + \lambda x + \rho$, wherein $\lambda, \rho \in GF(2^4)$. Representing A as A=ax+b and $A^{16}$ as $A^{16}$=cx+d, the computation operation for deriving $A^{17}$ is expressed as follows:

$$A^{17} = (ax+b)(cx+d) \bmod(x^2 + \lambda x + \rho) \quad (3)$$
$$= acx^2 + (ad+bc)x + bd \bmod(x^2 + \lambda x + \rho)$$
$$= (ad+bd+ac\lambda)x + (bd+ac\rho)$$

Since, from the above descriptions, $A^{17}$ is known as a constant polynomial, the computation for deriving $A^{17}$ is simplified:

$$A^{17} = bd + ac\rho \quad (4)$$

In an exemplary embodiment of the present invention, the computation (i.e., two multiplication operations at the Galois Field $GF(2^4)$, a constant multiplication operation and an addition operation) are executed at the normal basis OF the Galois Field $GF(2^4)$. This is because the computation operations over the normal basis can promote operation efficiency and further reduce the circuit complexity. Since how to choose an appropriate normal basis in the finite field (Galois Field) is well-known by people familiar with the field theory, further details are omitted here for the sake of brevity. However, please note that the operations of the present invention are not limited to being executed over a specified normal basis; with appropriate design variations, alternative suitable normal basis are chosen accordingly. The alternative designs obey and fall within the scope of the present invention.

Since in the operations in Step S160, the multiplicative inverse $A^{-17}$ of $A^{17}$ is derived at the composite field $GF(2^4)^2$, and $A^{-17}$ is a constant polynomial as inferred above, the operation in Step S170 deriving the multiplicative inverse $A^{-1}$ is realized by a multiplication operation at the composite field $GF(2^4)^2$.

$$A^{-1} = (A^{17})^{-1} \cdot A^{16} \quad (5)$$
$$= A^{-17} \cdot (cx + d)$$
$$= cA^{-17}x + dA^{-17}$$

In the computation above, the step for deriving $A^{16}$ ($A^{16}$=cx+d) is computed via first transferring the input byte A to the normal basis OF the Galois Field $GF(2^8)$, and then perform a power operation to execute the multiplication operation over the normal basis more effectively.

As shown in FIG. 1, the aforementioned flows for deriving the multiplication inverse include a plurality of linear transformations, such as a transform matrix used in the isomorphism map (first isomorphism map) in Step S110, wherein the transform matrix is utilized for isomorphism mapping the input byte A from the polynomial basis of the Galois Field $GF(2^8)$ to the polynomial basis of the composite field $GF(2^4)^2$. For the sake of brevity, in the following descriptions, the 8*8(isomorphism) transform matrix adopted in Step S110 is denoted as $T_{poly}^{comp}$; similarly, the 8*8(isomorphism) transform matrix adopted in Step S120 (in the second isomorphism map) is denoted as $T_{comp}^{norm}$; the 8*8(isomorphism) transform matrix adopted in Step S140 (i.e., the third isomorphism map) is denoted as $T_{norm}^{comp}$; and the 8*8(isomorphism) transform matrix adopted in Step S180 (i.e., the fourth isomorphism map) is denoted as $T_{comp}^{poly}$. By finely considering the corresponding Hamming weight in the aforementioned transform matrixes, or, by considering other referencing rules corresponding to the circuit complexity of the transform matrixes; appropriate irreducible polynomial(s) can be chosen according to various design requirements. That is, any specified irreducible polynomial is not meant to be a limitation of the present invention, and alternative irreducible polynomials can be chosen for achieving the circuit structures of the S-Box and/or the inverse S-Box according to the above disclosures of the present invention. The alternative designs obey and fall within the scope of the present invention.

Due to the exceeding difficulty of deriving the transform matrix $T_{comp}^{norm}$ adopted in Step S120 (the second isomorphism map) and therefore the process for deriving the transform matrix $T_{norm}^{comp}$ adopted in Step S140 (the third isomorphism map), the transform matrixes $T_{comp}^{norm}$ and $T_{norm}^{comp}$ are derived independently:

$$T_{comp}^{norm} = T_{poly}^{norm} \times T_{comp}^{poly} \quad (6)$$

and $$T_{norm}^{comp} = T_{poly}^{comp} \times T_{norm}^{poly} \quad (7)$$

In equation (6), the operation ($T_{comp}^{norm}$) for isomorphism mapping the input data from a composite field into a normal basis can be derived via firstly transferring the input data from the composite field (e.g., composite field $(2^L)^M$ to a polynomial basis over a corresponding Galois field (e.g., the Galois Field $GF(2^K)$), where the first part of the operation is denoted as $T_{comp}^{poly}$; then mapping the data from the polynomial basis to the normal basis (denoted as $T_{poly}^{norm}$). Since the isomorphism mapping corresponding to the transform matrix $T_{norm}^{comp}$ can be easily performed via the inferring of the equation (7), further description is omitted here for the sake of brevity.

In the designing of the circuits, the applied irreducible polynomials of the transform matrixes will affect the corresponding circuit area of the S-Box and the inverse S-Box; thereby in an exemplary embodiment of the present invention, a normal basis $\{\beta^{2^0}, \beta^{2^1}, \beta^{2^2}, \beta^{2^3}, \beta^{2^4}, \beta^{2^5}, \beta^{2^6}, \beta^{2^7}\} = \{\alpha^5, \alpha^{10}, \alpha^{20}, \alpha^{40}, \alpha^{80}, \alpha^{160}, \alpha^{65}, \alpha^{130}\}$ over the Galois Field $GF(2^8)$ is used. Furthermore, by finely considering the Hamming weight of the transform matrixes in the operations, an exemplary embodiment of the transform matrix $T_{poly}^{norm}$ in equation (6) and the transform matrix $T_{norm}^{poly}$ equation (7) are expressed as follows:

$$T_{ploy}^{norm} = \begin{bmatrix} 0 & 1 & 0 & 1 & 0 & 1 & 1 & 1 \\ 0 & 0 & 0 & 1 & 1 & 1 & 1 & 1 \\ 1 & 1 & 0 & 0 & 0 & 1 & 1 & 1 \\ 0 & 1 & 0 & 0 & 1 & 0 & 1 & 1 \\ 0 & 1 & 0 & 1 & 1 & 0 & 0 & 1 \\ 0 & 0 & 0 & 1 & 1 & 1 & 0 & 1 \\ 0 & 0 & 0 & 1 & 0 & 1 & 1 & 1 \\ 0 & 0 & 1 & 1 & 0 & 1 & 1 & 1 \end{bmatrix}$$

$$T_{norm}^{poly} = \begin{bmatrix} 1 & 1 & 1 & 1 & 1 & 1 & 0 & 0 \\ 1 & 0 & 0 & 0 & 0 & 0 & 1 & 0 \\ 0 & 0 & 0 & 0 & 0 & 0 & 1 & 1 \\ 0 & 1 & 0 & 1 & 1 & 1 & 0 & 0 \\ 0 & 1 & 0 & 0 & 0 & 0 & 1 & 0 \\ 1 & 0 & 0 & 0 & 1 & 1 & 1 & 0 \\ 0 & 1 & 0 & 0 & 0 & 1 & 0 & 0 \\ 1 & 0 & 0 & 1 & 0 & 1 & 0 & 0 \end{bmatrix}$$

As mentioned above, in Step S140, a power operation ($A^{16}$) over the normal basis is a linear operation cyclically shifting the elements therein. In some exemplary embodiments of the present invention, the linear operations (e.g., the isomorphism maps and the power operation in steps S110, S120, S130, S140, and S180) can be merged to form a new transform matrix; such as merging the linear operations in Step S120, S130, and S140 to derive a new transform matrix to promote the operation efficiency, wherein a corresponding matrix of the power operation is denoted as S:

$$S = \begin{bmatrix} 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix}$$

In other words, in a further exemplary embodiment of the present invention, partial linear operations of the steps for deriving the multiplicative inverse can be combined to provide a corresponding transform matrix; for instance, the operations from the steps S120-S140 can be merged as follows:

$$\begin{aligned} TST &= T_{norm}^{comp} \times S \times T_{comp}^{norm} \\ &= T_{poly}^{comp} \times T_{norm}^{poly} \times S \times T_{poly}^{norm} \times T_{comp}^{poly}. \end{aligned} \quad (8)$$

Figure 2:
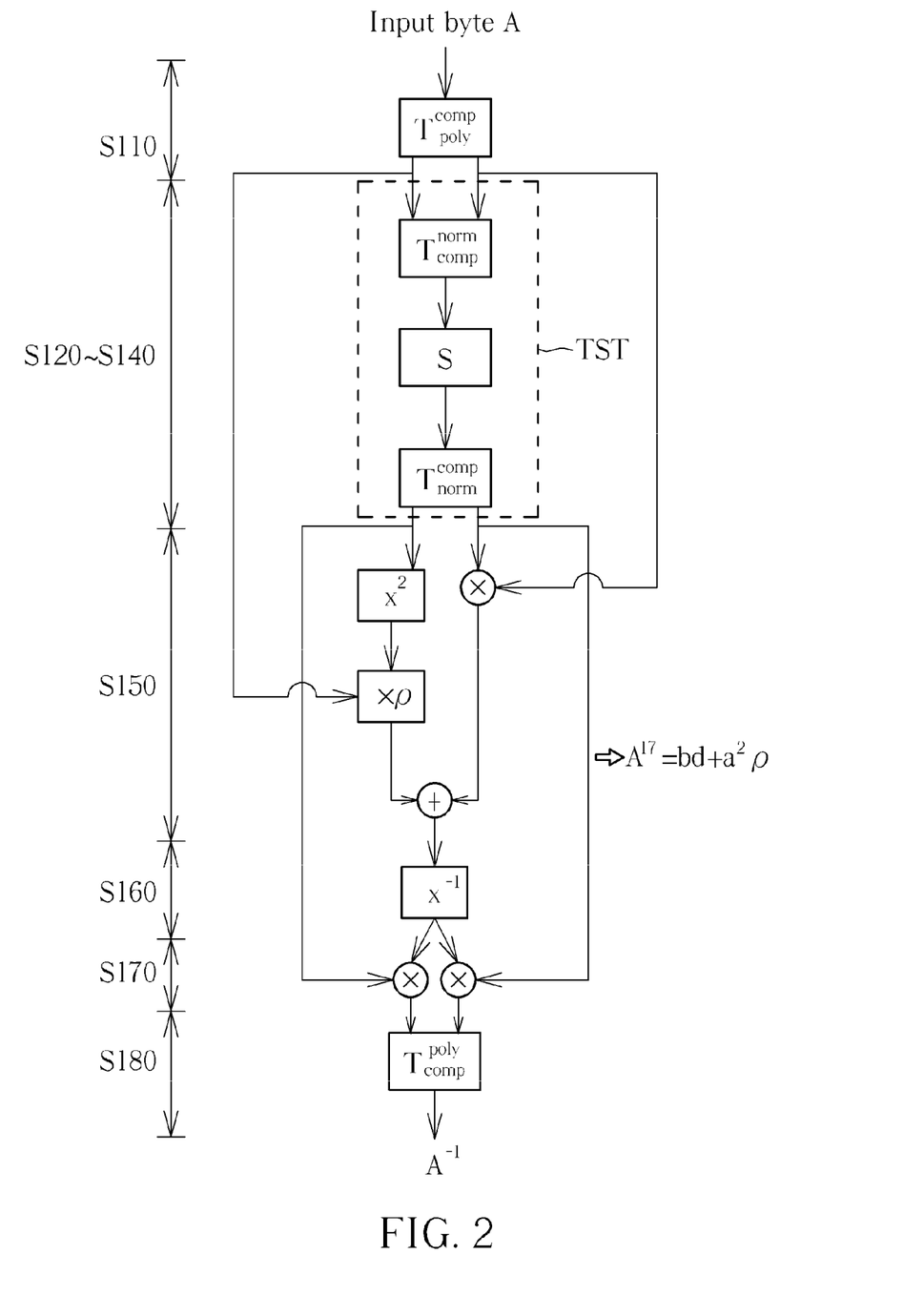
FIG. 2 is a flowchart illustrating another exemplary embodiment for deriving a multiplicative inverse at a Galois Field GF ($2^8$) corresponding to an input data according to AES computation of the present invention.

Please refer to FIG. 2. FIG. 2 is a flowchart illustrating another exemplary embodiment for deriving a multiplicative inverse at a Galois Field GF($2^8$) corresponding to an input data according to AES computation. As shown in FIG. 2, the operations from the steps S120-S140 are merged to form a transform matrix since the operations from the steps S120-S140 are linear operations; that is, in this embodiment, an appropriate irreducible polynomial corresponding to equation (9) can be chosen, wherein equation (9) corresponds to the computation of multiplicative inverse as disclosed in the present invention.

$$(\lambda, \rho) = \arg \min_{\lambda, \rho \in GF(2^4)} w(T_{ploy}^{comp}) + w(TST) + w(T_{comp}^{poly}) + 4w(\rho) \quad (9)$$

Please refer to FIG. 2 in conjunction with equation (9). Herein the coefficients can be set as $\lambda = \gamma^7$, and $\rho = \gamma^8$ by calculating the Hamming weights correspondingly, merging the operations from the steps S120-S140, and finely considering other steps in the flow chart; wherein $\gamma$ is an element at a Galois Field GF($2^4$) and $\gamma$ is a primitive element. Denoting the two coefficients at the normal basis over the Galois Field GF($2^4$); the matrix forms of the coefficients can be expressed as follows:

$$\bar{\lambda} = [0111],$$

and $$\bar{\rho} = [1100].$$

Consequently, corresponding transform matrixes used in the operations for deriving the multiplicative inverse can be expressed as follows:

$$T_{ploy}^{comp} = \begin{bmatrix} 0 & 0 & 0 & 0 & 1 & 1 & 1 & 0 \\ 0 & 1 & 1 & 1 & 0 & 0 & 0 & 0 \\ 1 & 0 & 1 & 0 & 0 & 0 & 0 & 0 \\ 0 & 1 & 1 & 1 & 0 & 0 & 1 & 0 \\ 1 & 1 & 1 & 0 & 1 & 1 & 1 & 1 \\ 0 & 0 & 0 & 0 & 0 & 1 & 1 & 1 \\ 1 & 1 & 0 & 1 & 0 & 0 & 0 & 1 \\ 1 & 0 & 0 & 0 & 0 & 0 & 0 & 1 \end{bmatrix}$$

$$TST = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 1 & 0 & 1 & 0 & 1 & 0 & 0 & 0 \\ 0 & 1 & 1 & 1 & 0 & 1 & 0 & 0 \\ 0 & 1 & 0 & 0 & 0 & 0 & 1 & 0 \\ 1 & 0 & 1 & 1 & 0 & 0 & 0 & 0 \end{bmatrix}$$

$$T_{comp}^{poly} = \begin{bmatrix} 0 & 1 & 1 & 0 & 0 & 0 & 1 & 1 \\ 1 & 1 & 0 & 0 & 1 & 0 & 1 & 0 \\ 0 & 1 & 0 & 0 & 0 & 0 & 1 & 1 \\ 1 & 1 & 0 & 0 & 1 & 0 & 0 & 1 \\ 1 & 1 & 1 & 0 & 0 & 1 & 1 & 0 \\ 0 & 0 & 1 & 1 & 0 & 1 & 1 & 0 \\ 0 & 1 & 0 & 1 & 0 & 0 & 0 & 0 \\ 0 & 1 & 1 & 0 & 0 & 0 & 1 & 0 \end{bmatrix}$$

Please refer to FIG. 2 in conjunction with FIG. 1. It is acknowledged that, in Step S150, the computation for deriving $A^{17}$ is derived via calculating a product corresponding to A and $A^{16}$, where A=ax+b and $A^{16}$=cx+d. By appropriate inferring, the coefficient c and the coefficient a are convinced as c=a, thereby the equation (4) can be simplified as:

$$A^{17} = bd + a^2 \rho \quad (10)$$

That is, as illustrated in FIG. 2, the operations in Step S150 are simplified as multiplication operations, an addition operation, and a square operation at a ground field $GF(2^4)$ via equation (10) since the $17^{th}$-order of the input byte A is derived as: $A^{17}$=bd+acρ=bd+$a^2$ρ=bd+$c^2$ρ. In this way the required circuit area is effectively reduced by executing the computation at a finely chosen normal basis. Since the inferring of the aforementioned equations and different types of normal basis over various Galois Fields is well known by people with ordinary skills in this art, the alternative designs of choosing different irreducible polynomial according to different operations at various normal bases corresponding to design variations also obey and fall within the scope of the present invention.

The operation order of the S-Box is to first compute the multiplicative inverse and then execute an affine transform upon the derived multiplicative inverse; for the operations of the inverse S-Box, the corresponding operation order is to first execute an inverse affine transform, and then compute a multiplicative inverse of the output of the inverse affine transform. In another exemplary embodiment of the present invention, besides providing a transform matrix by merging the operations from the steps S12-S140, the linear part of the affine transform in the S-Box is considered (i.e., in the encryption process) to provide a transform matrix required in Step S110 for choosing the coefficients of the used irreducible polynomials accordingly. In this way, the circuit area of the S-Box is further reduced, wherein the coefficients of the irreducible polynomial can be chosen as follows:

$$(\lambda, \rho) = \arg \min_{\lambda, \rho \in GF(2^4)} w(T_{poly}^{comp}) + w(TST) + w(FT_{comp}^{poly}) + 4w(\rho) \quad (11)$$

Figure 3:
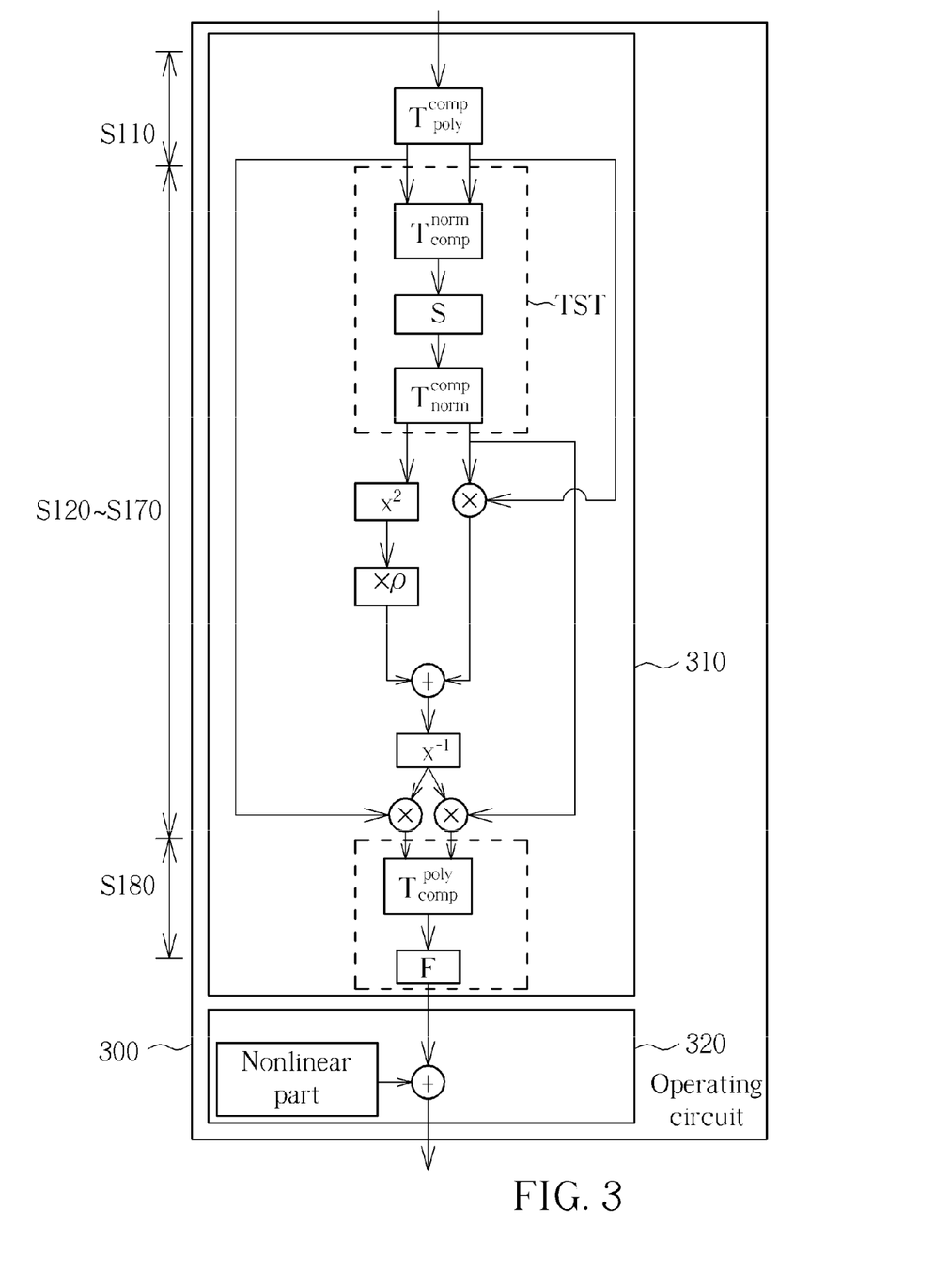
FIG. 3 is a block diagram illustrating a first exemplary embodiment of an operating circuit of the present invention.

Equation (11) considers the coefficients λ and ρ of the irreducible polynomial according to the plurality of transform matrixes in the operations for deriving the multiplicative inverse and according to the linear part (denoted as F) of the affine transform. That is, the operating circuit executes a computation for deriving a multiplicative inverse and then executes an affine transform upon the derived multiplicative inverse when executing the S-Box operation; the operating circuit executes an inverse affine transformation and then executes the computation for deriving the multiplicative inverse when executing the inverse S-Box operation. Furthermore, an operating circuit capable of executing both the S-Box operation and the Inverse S-Box operation in a single circuit structure is available according to the disclosure of the present invention. The detailed operations are described as follows:

Please refer to FIG. 2, equation (11), and FIG. 3. FIG. 3 is a block diagram illustrating a first exemplary embodiment of the operating circuit 300 of the present invention. In this embodiment, the operating circuit 300 executes S-Box operations complying with the AES system, and the operating circuit 300 includes a multiplicative inverse 310, and an affine transform unit 320. Supposing that the affine transform is expressed as: y=Fx+b, and the inverse affine transform is expressed as: x=$F^{-1}$(y+b)=$F^{-1}$y+$F^{-1}$b=$F^{-1}$y+a; and an input data derived from the multiplicative inverse unit 310 after executing Steps S110~180 is the derived linear part Fx of the aforementioned affine transform, the operating unit 320 then includes the nonlinear part of the affine transform to accomplish the operation of the affine transform: y=Fx+b. Please note that the multiplicative inverse unit 310 includes the computation of the multiplicative inverse and of the linear part F of the affine transform, and the multiplicative inverse unit 310 executes at least a plurality of isomorphism maps to derive a multiplicative inverse (e.g., $A^{-1}$) at a specific Galois Field (e.g., the Galois Field $GF(2^8)$) corresponding to an input data (e.g., the aforementioned input byte A), wherein the plurality of isomorphism maps includes change(s) of basis. Moreover, the operating unit 320 accomplishes the computation of an affine transform upon the multiplicative inverse $A^{-1}$; wherein the affine transform is a nonlinear operation including a linear part. That is, in some exemplary embodiments of the present invention, the applied transform matrix $FT_{poly}^{comp}$ is chosen according to both the linear part (F) of the affine transform and the fourth isomorphism map $T_{comp}^{poly}$. Since the operations of the multiplicative inverse unit 310 and that of the operating unit 320 are disclosed as above, further descriptions are omitted here for the sake of brevity. In other words, as shown in equation (11), coefficients of the irreducible polynomial can be chosen by considering the Hamming weight corresponding to the transform matrixes in the multiplicative inverse computation (e.g., merging the first isomorphism map, the power operation and the second isomorphism map to provide a new transform matrix, and merging the linear part of the affine transformation with the computation corresponding to Step S180 to provide another transform matrix correspondingly), for instance, the coefficients λ and ρ can be chosen as λ=$\gamma^7$ and ρ=$\gamma^8$, wherein γ is an element in the Galois Field $GF(2^4)$, and γγ is a power prime. By applying the aforementioned computations, a minimum circuit area of an apparatus for executing the S-Box operations of the encryptions operations and a corresponding AES system is provided.

Similarly, in other exemplary embodiments of the present invention, apparatuses for executing the inverse S-Box operations in the decryption operations of the AES system are provided by choosing appropriate coefficients/factors of the irreducible polynomial according to computation for the inverse affine transform and for the multiplicative inverse operation, to thereby reduce the circuit area. Please refer to equation (12), which illustrates choosing the coefficients/factors of the irreducible polynomial by considering the linear part of the inverse affine transform, and the plurality of transform matrixes.

$$(\lambda, \rho) = \arg \min_{\lambda, \rho \in GF(2^4)} w(T_{poly}^{comp} F^{-1}) + w(TST) + w(T_{comp}^{poly}) + 4w(\rho) \qquad (12)$$

wherein $F^{-1}$ expresses the linear part of the inverse affine transform in the inverse S-Box operations; since the detailed operation of equation (12) can be easily understood according to the above disclosure (e.g. the description corresponding to equation (11)), further descriptions are omitted here for the sake of brevity.

Figure 4:
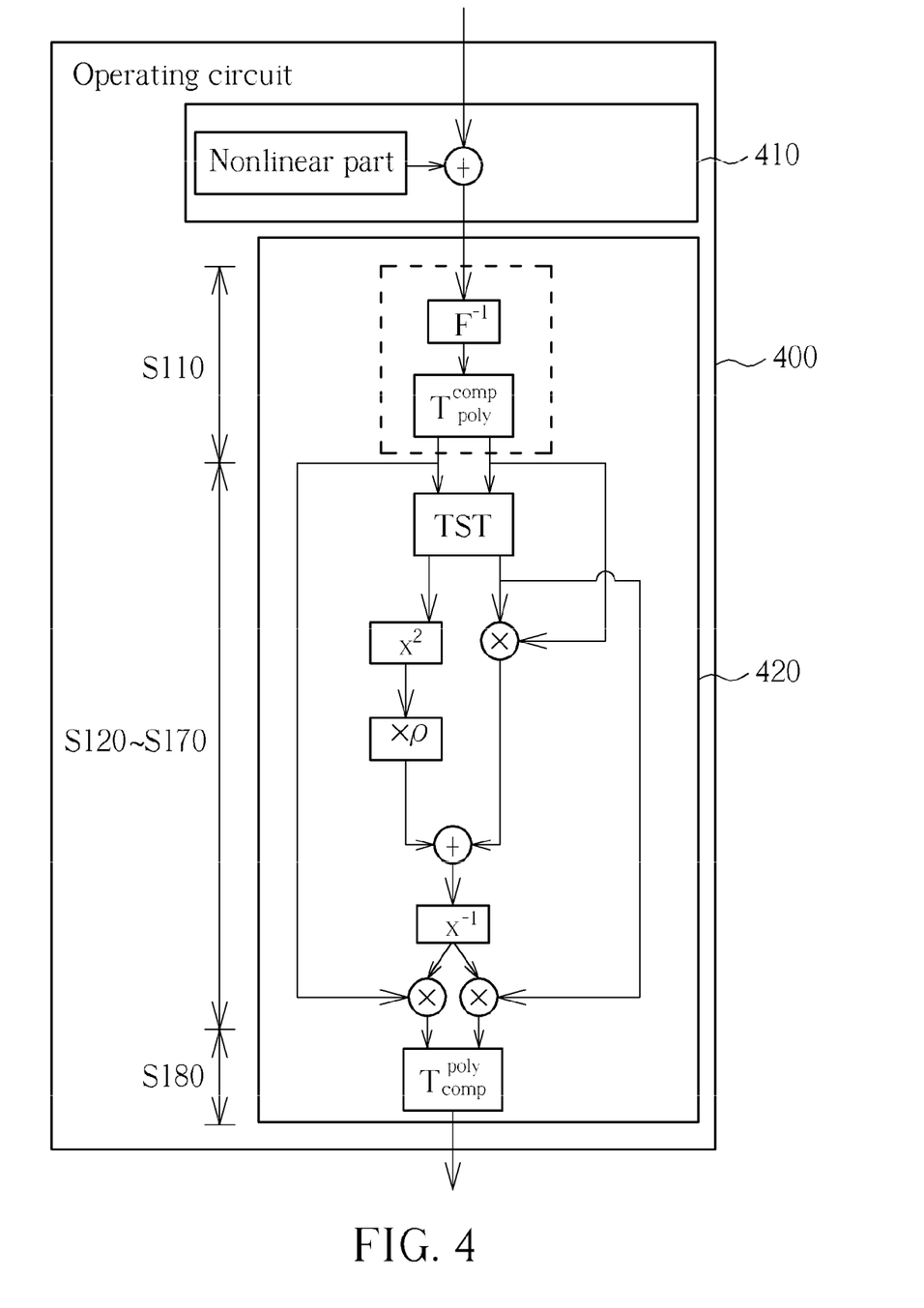
FIG. 4 is a block diagram illustrating a second exemplary embodiment of the operating circuit of the present invention.

Please refer to FIG. 4 in conjunction with equation (12). FIG. 4 is a diagram illustrating a block diagram of a second exemplary embodiment of the present invention. In this exemplary embodiment, the operating circuit 400 is utilized for executing computations of the inverse S-Box operations complying with the decryption computations of the AES system; furthermore, the operating circuit 400 includes an inverse affine transform unit 410 and a multiplicative inverse unit 420. As mentioned above, the computation of the inverse affine transform can be expressed as:

$$x = F^{-1}(y+b) = F^{-1}y + F^{-1}b = F^{-1}y + a.$$

In this exemplary embodiment, the inverse affine transform unit 410 executes the nonlinear part of the inverse affine transform (a), and the multiplicative inverse unit 420 executes the computation including the linear part $F^{-1}$ of the inverse affine transform. The inverse affine transform unit 410 executes computation relating to the inverse affine transform to transmit an input data to the multiplicative inverse unit 420, and the multiplicative inverse unit 420 executes the computation corresponding to the linear part of the inverse affine transform and the computation of the multiplicative inverse operations. More clearly, the multiplicative inverse unit 420 executes at least a plurality of isomorphism maps to derive a multiplicative inverse (e.g., $A^{-1}$) at a specified Galois Field (e.g., the Galois Field $GF(2^8)$) corresponding to an input data (e.g., the input byte A), where the plurality of isomorphism maps include change(s) of basis. Once the operating circuit of the present invention needs to execute the computation corresponding to the inverse S-Box operations of the decryption process complied with the AES system, the coefficients/factors of the irreducible polynomial with minimum circuit area can be chosen by considering the linear part of the inverse affine transform and considering the transform matrixes applied in the computation for deriving the multiplicative inverse. For example, the linear part $F^{-1}$ of the inverse affine transform can be merged with the transform matrix $T_{poly}^{comp}$ to thereby provide a corresponding transform matrix $T_{poly}^{comp} F^{-1}$ (FIG. 4), and further considering other transform matrixes applied in the multiplicative inverse operations to choose the appropriate coefficients/factors of the irreducible polynomial to lead to the reduced circuit area; the corresponding coefficients can be set as $\lambda = \gamma^5$, and $\rho = \gamma^8$.

Figure 5:
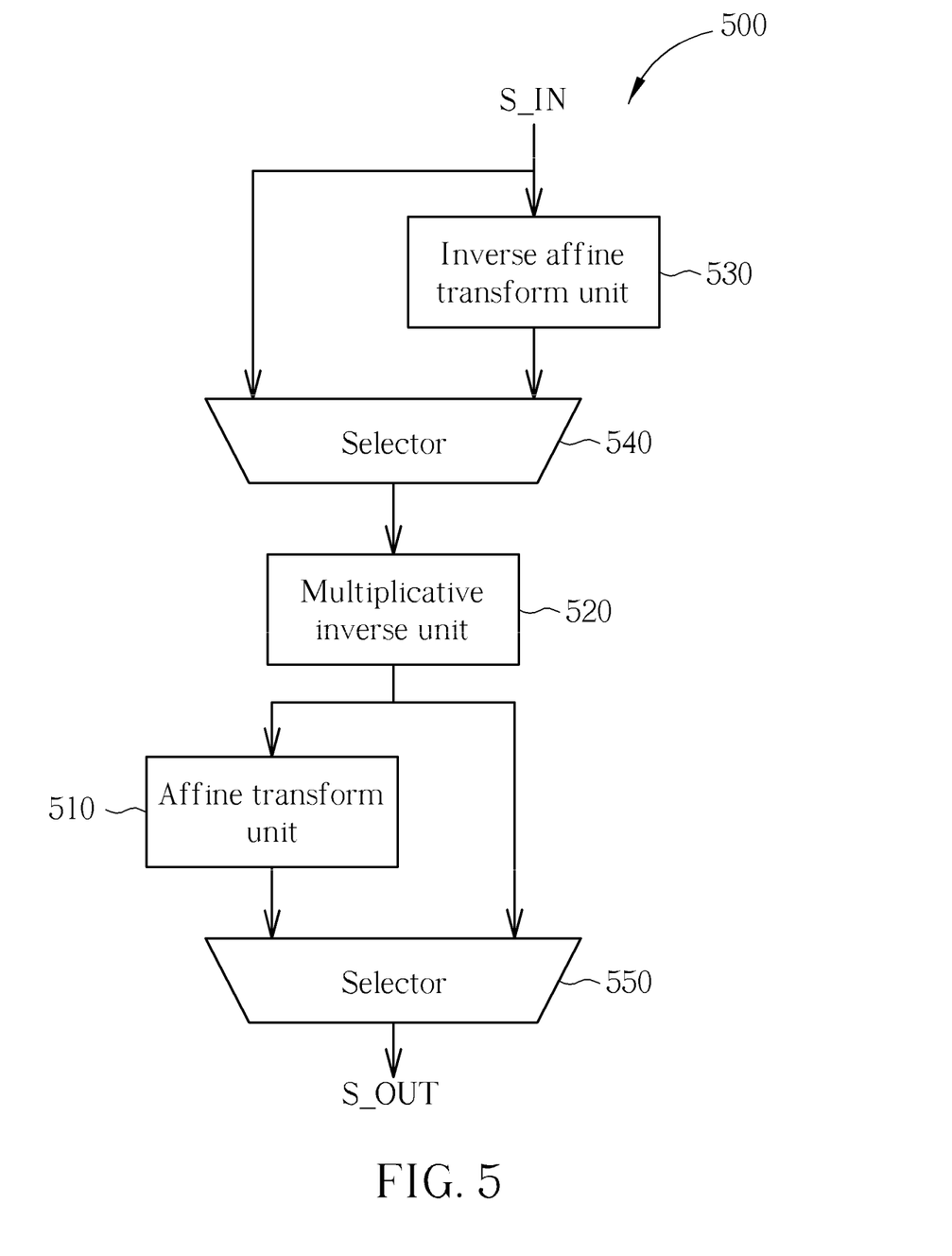
FIG. 5 is a block diagram illustrating a third exemplary embodiment of the operating circuit of the present invention.

Please refer to FIG. 5. FIG. 5 is a block diagram illustrating a third exemplary embodiment of the operating circuit 500 of the present invention. Herein the operating circuit 500 executes both the operations corresponding to the S-Box operations in the encryption process of AES, and the inverse S-Box operations in the decryption process of AES; the operating circuit 500 includes an affine transform unit 510, a multiplicative inverse unit 520, an inverse affine transform unit 530, and selectors 540, 550. As shown in FIG. 5, for further reducing the circuit area and cost, the operating circuit 500 shares the circuit elements for executing the S-Box operations and the inverse S-Box operation. For instance, by applying the selector 540 and 550, the multiplicative inverse unit 520 can be shared in the S-Box operation and the inverse S-Box operations, to thereby boost the circuit efficiency. In an exemplary embodiment, the selector 540 selects a result operating by the inverse affine transform unit 530 as the input of the multiplicative inverse unit 520, and the selector 550 selects the signal output from the multiplicative inverse unit 520 as the output data S_OUT when the operating circuit 500 executes the computation of the S-Box. The selector 540 also selects the input S_IN as the input data, and the selector 550 selects the result processed by the multiplicative inverse unit 520 and by the affine transform unit 510 as the output S-OUT.

When the operating circuit is expected to provide both the encryption capability and the decryption capability complying with AES; the required circuit cost of the community operating circuit can be provided via choosing the coefficients/factors of the irreducible polynomial by considering the affine transform in the S-Box operations, the inverse affine transform in the inverse S-Box operations, and the computation of the multiplicative inverse. Please refer to equation (13), which illustrates the process for choosing appropriate coefficients/factors of the irreducible polynomial by considering the linear part of the affine transform, the linear part of the inverse affine transform, and the transform matrixes used in the multiplicative inverse operations.

$$(\lambda, \rho) = \arg \min_{\lambda, \rho \in GF(2^4)} w(T_{poly}^{comp} F^{-1}) + w(TST) + w(FT_{comp}^{poly}) + 4w(\rho) \qquad (13)$$

In the equation (13), the appropriate coefficients are chosen according to the Hamming weight corresponding to a plurality of transform matrixes in the multiplicative inverse operations, the linear part (denoted as $F^{-1}$) of the inverse affine transform, and the linear part (denoted as F) of the affine transform, to thereby reduce the circuit complexity; further descriptions of the equation (13) are omitted here since they can be easily understood from the above disclosure.

Figure 6:
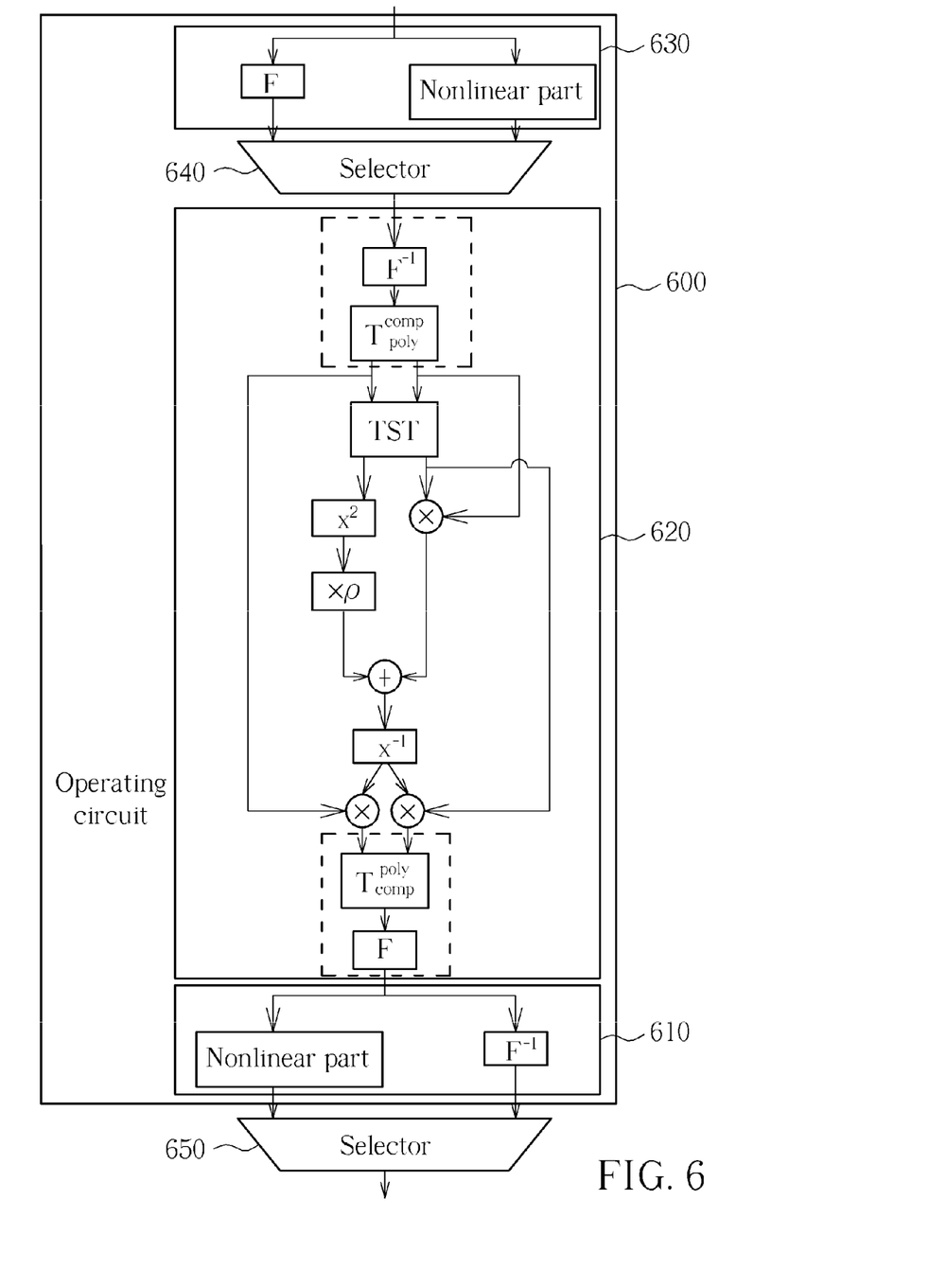
FIG. 6 is a block diagram illustrating a fourth exemplary embodiment of the operating circuit of the present invention.

Please refer to FIG. 6 in conjunction with FIG. 5 and the equation (13). FIG. 6 is a block diagram illustrating a fourth exemplary embodiment of the operating circuit of the present invention. In this example, the operating circuit 600 executes the computation corresponding to the S-Box operations and to the inverse S-Box operations that comply with the AES system; the operating circuit 600 includes an affine transform unit 610, a multiplicative inverse unit 620, an inverse affine transform unit 630, and the selectors 640 and 650. A compact circuit structure of the operating circuit 600 is provided by considering the computation corresponding to the encryption process and corresponding to the decryption process; that is, by choosing the coefficients/factors of the corresponding irreducible polynomial by considering a transform matrix corresponding to the linear part $F^{-1}$ of the inverse affine transform and the first isomorphism map $T_{poly}{}^{comp}$, and considering a transform matrix according to the fourth isomorphism map $T_{comp}{}^{poly}$ and the linear part F of the affine transform according to the Hamming weight, the coefficients of the irreducible polynomial can be set as $\lambda=\gamma^{10}$, and $\rho=\gamma^8$.

The conventional complex computation at the specific Galois Field $GF(2^8)$ is eased extremely by applying computation at the composite field and by change(s) of basis. In the present invention, the required multiplicative inverse can be derived at a normal basis over a ground field $GF(2^4)$ according to a chosen normal basis. For instance, a normal basis: $\{\tau^{2^0}, \tau^{2^1}, \tau^{2^2}, \tau^{2^3}\}=\{\gamma^3, \gamma^6, \gamma^{12}, \gamma^9\}$ can be adopted, and a simplified much smaller lookup table corresponding to multiplicative inverses of each element can be used. In this way, an alternative lookup table corresponding to the selected normal basis can be made to further ease the operation on the basis of applying the aforementioned method for deriving the multiplicative inverse at a specified Galois Field corresponding to an input data. The details of the lookup table are well known by people having ordinary skills in this art and are therefore omitted here for the sake of brevity. All the alternative designs that choose a different normal basis in the process of deriving the multiplicative inverse obey and fall within the scope of the present invention. However, please note that using the lookup table in the process of deriving the multiplicative inverse is for illustrative purposes only and is not meant to be a limitation of the present invention. In other alternative designs, the aforementioned steps can be executed repeatedly to further ease the computation for deriving the multiplicative inverse at the specified Galois Field $GF(2^4)$. In addition, please note that using the equations (11), (12), and (13) to choosing the coefficients according to the Hamming weight is for illustrative purposes only and is not meant to be a limitation of the present invention. All alternative designs using other equations to choose the irreducible polynomial corresponding to the isomorphism maps in the operations according to different design requirements obey and fall within the scope of the present invention.

Figure 7:
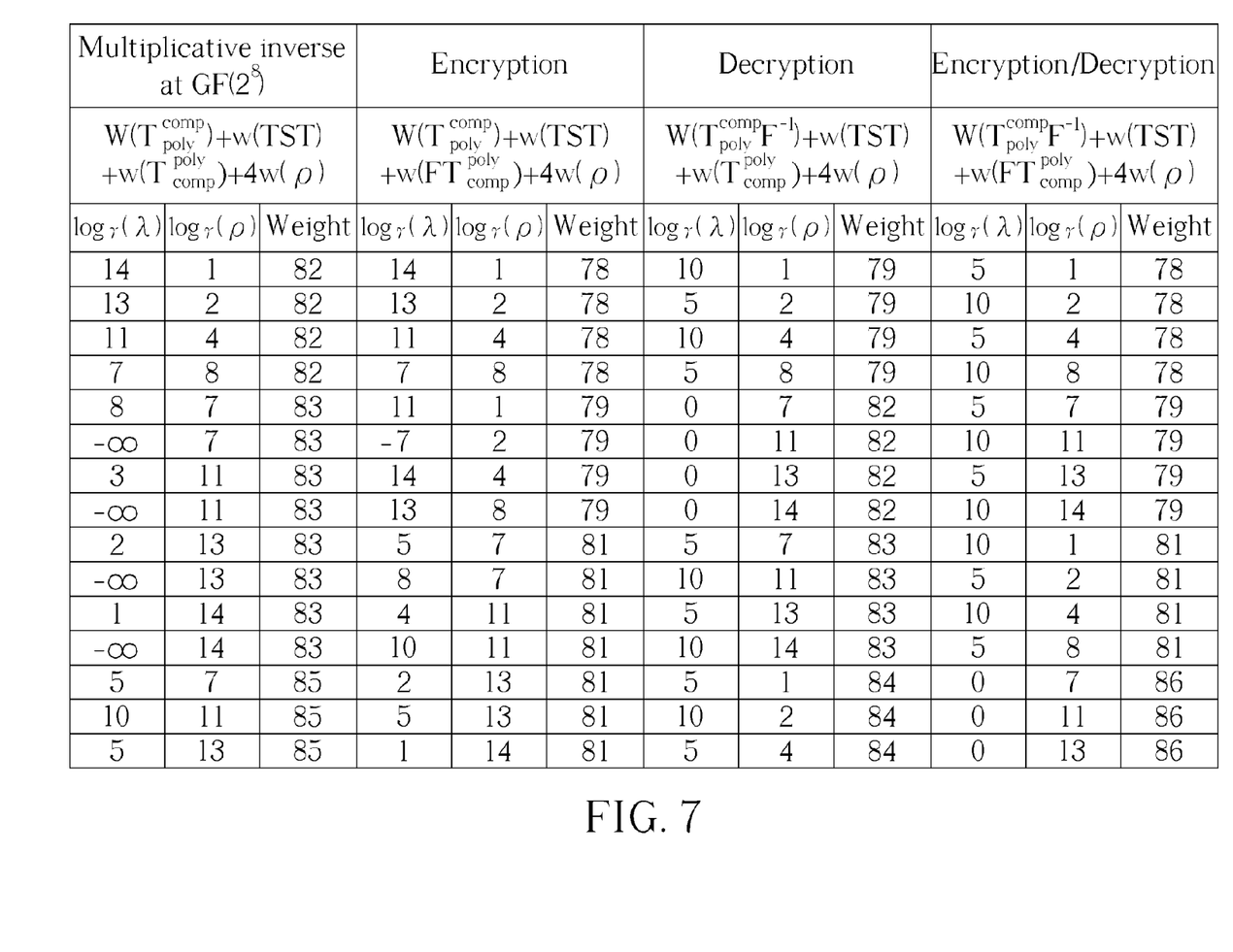
FIG. 7 is an exemplary embodiment for choosing factors/coefficients of the irreducible polynomial required in FIG. 1-FIG. 6 according to the Hamming weight.

Please refer to FIG. 7. FIG. 7 is an exemplary embodiment for choosing the factors/coefficients of the irreducible polynomial required in FIG. 1-FIG. 6 according to the Hamming weight. Herein, the coefficients differ when the corresponding Hamming weight differs. Please note that the present invention is not restricted to choosing the coefficients/factors of the irreducible polynomial according to the isomorphism maps and/or the linear part of the affine transform and/or the linear part of the inverse affine transform. Different criteria/rules can be used for choosing the irreducible polynomial according to the aforementioned multiplicative inverse computation and/or the operations of the affine transform and/or the operations of the inverse affine transform; all alternative designs obey and fall within the scope of the present invention.

In summary, the present invention provides a method for dealing with the computation at the Galois Field. The method includes: providing an operating circuit which has at least a multiplicative inverse unit; and using the multiplicative inverse unit to execute at least a plurality of isomorphism maps for deriving a multiplicative inverse at a specific Galois Field corresponding to an input data, wherein the plurality of isomorphism maps comprise at least a change of basis.

Those skilled in the art will readily observe that numerous modifications and alterations of the device and method may be made while retaining the teachings of the invention.

What is claimed is:

1. A method for dealing with Galois Field computation, comprising:
    providing an operating circuit which has at least a multiplicative inverse unit; and
    using the multiplicative inverse unit to execute at least a plurality of isomorphism maps for deriving a multiplicative inverse of an input data on a specific Galois Field, wherein the plurality of isomorphism maps comprise at least a change of basis, wherein providing the operating circuit comprises selecting coefficients of an irreducible polynomial for designing the multiplicative inverse unit,
    wherein the coefficients are selected according to a Hamming weight, a power operation matrix, and the plurality of isomorphism maps,
    wherein the irreducible polynomial is $m(x)=x^2+\lambda x+\rho$ and wherein $\lambda$ and $\rho$ are the coefficients of the irreducible polynomial,
    wherein the step of deriving the multiplicative inverse of the input data on the specific Galois Field comprises:
    executing a first isomorphism map for transferring the input data from a polynomial basis over the specific Galois Field $GF(2^K)$ to a polynomial basis over a composite field $GF(2^L)^M$, wherein $K=L*M$;
    executing a second isomorphism map for transferring from the polynomial basis over the composite field $GF(2^L)^M$ to a normal basis over the specific Galois Field $(2^K)$;
    executing a power operation at the normal basis over the specific Galois Field $GF(2^K)$ for deriving a predetermined power of the input data;
    executing a third isomorphism map for transferring the predetermined power of the input data to the polynomial basis over the composite field $GF(2^L)^M$;
    deriving a product of the input data after processing by the first isomorphism map, and the predetermined power of the input data after processing by the third isomorphism map;
    deriving a multiple inverse of the product at a ground field $GF(2^L)$;
    deriving a product of the input data after processing by the third isomorphism map and the multiplicative inverse of the product for deriving a multiple inverse of the input data over the basic field $GF(2^L)$; and
    executing a fourth isomorphism map for transferring the multiple inverse over the basic field $GF(2^L)$ from the polynomial basis over the composite field $GF(2^L)^M$ to the polynomial basis over the specific Galois Field $GF(2^K)$.

2. The method of claim 1, further comprising plural change of basis that include the at least the change in basis, wherein the plural change of basis comprises transformations between a polynomial basis, a polynomial composite basis, and a normal basis.

3. The method of claim 1, wherein the plurality of isomorphism maps comprise a first isomorphism map, a second isomorphism map, a third isomorphism map, and a fourth isomorphism map; the first isomorphism map transfers from a polynomial basis over the specific Galois Field $GF(2^K)$ to a polynomial basis over a composite field $GF(2^L)^M$, wherein $K=L*M$; the second isomorphism map transfers from the polynomial basis over the composite field $GF(2^L)^M$ to a normal basis over the specific Galois Field $GF(2^K)$; the third isomorphism map transfers from the normal basis over the specific Galois Field $GF(2^K)$ to a polynomial basis over the composite field $GF(2^L)^M$; and the fourth isomorphism map transfers from the polynomial basis over the composite field $GF(2^L)^M$ to a polynomial basis over the specific Galois Field $GF(2^K)$.

4. The method of claim 3, wherein the composite field $GF(2^L)^M$ is constructed by a Galois Field (finite field) $GF(2^L)$ and an $M^{th}$ order irreducible polynomial.

5. The method of claim 1, wherein the step of deriving the multiplicative inverse of the input data on the specific Galois Field further comprises:
   deriving the multiplicative inverse by executing the power operation on a normal basis over the composite field $GF(2^L)^M$.

6. The method of claim 5, wherein the plurality of isomorphism maps and the power operation are linear operations, and the step of designing the multiplicative inverse unit comprises:
   merging at least two linear operations of the linear operations to provide a corresponding transform matrix.

7. The method of claim 6, wherein the specific Galois Field is a finite field $GF(2^8)$ and the composite field $GF(2^L)^M$ is a composite field $GF(2^4)^2$.

8. The method of claim 7, wherein the coefficients $\lambda$ and $\rho$ are chosen according to an equation as follows:

$$(\lambda, \rho) = \arg \min_{\lambda, \rho \in GF(2^4)} w(T_{poly}^{comp}) + w(T_{norm}^{comp} S T_{comp}^{norm}) + w(T_{comp}^{poly}) + 4w(\rho),$$

where w is the Hamming weight, S is a matrix corresponding to the power operation, $T_{poly}^{comp}$ is the first isomorphism map, $T_{comp}^{norm}$ is the second isomorphism map, $T^{normcomp}$ is the third isomorphism map, $T_{comp}^{poly}$ is the fourth isomorphism map, and F is the linear part of the affine transform.

11. The method of claim 7, wherein the operating circuit executes an inverse S-box operation which complies with an advanced encryption standard (AES); the operating circuit further comprises an inverse affine transform unit; the method further comprises:
   utilizing the inverse affine transform unit to execute an inverse affine transform to generate the input data to the multiplicative inverse unit; and the step of designing the multiplicative inverse unit further comprises:
   merging a linear part of the inverse affine transform and the first isomorphism map to provide a corresponding first transform matrix; and
   merging the second isomorphism map, the power operation, and the third isomorphism map to provide a corresponding second transform matrix.

12. The method of claim 11, wherein the coefficients $\lambda$ and $\rho$ are chosen according to an equation as follows:

$$(\lambda, \rho) = \arg \min_{\lambda, \rho \in GF(2^4)} w(T_{poly}^{comp} F^{-1}) + w(T_{norm}^{comp} S T_{comp}^{norm}) + w(T_{comp}^{poly}) + 4w(\rho),$$

where w is the Hamming weight, S is a matrix corresponding to the power operation, $T_{poly}^{comp}$ is the first isomorphism map, $T_{comp}^{norm}$ is the second isomorphism map, $T_{norm}^{comp}$ is the third isomorphism map, $T_{comp}^{poly}$ is the fourth isomorphism map, and $F^{-1}$ is the linear part of the inverse affine transform.

13. The method of claim 7, wherein the operating circuit utilizes the multiplicative inverse unit to execute both an S-box operation and an inverse S-box operation complied with an advanced encryption standard (AES); the operating circuit further comprises an affine transform unit and an inverse affine transform; the method further comprises:
   utilizing the affine transform unit to execute an affine transform upon an output of the multiplicative inverse unit when the operating circuit executes the S-box operation, and utilizing the inverse affine transform unit to execute an inverse affine transform to generate the input data to the multiplicative inverse unit when the operating circuit executes the inverse S-box operation; and the step of designing the multiplicative inverse unit further comprises:
   merging a linear part of the inverse affine transform and the first isomorphism map to provide a corresponding first transform matrix;
   merging the second isomorphism map, the power operation, and the third isomorphism map to provide a corresponding second transform matrix; and
   merging the fourth isomorphism map and a linear part of the affine transform to provide a corresponding third transform matrix.

14. The method of claim 13, wherein the coefficients $\lambda$ and $\rho$ are chosen according to an equation as follows:

$$(\lambda, \rho) = \arg \min_{\lambda, \rho \in GF(2^4)} w(T_{poly}^{comp} F^{-1}) + w(T_{norm}^{comp} S T_{comp}^{norm}) + w(F T_{comp}^{poly}) + 4w(\rho),$$

where w is the Hamming weight, S is a matrix corresponding to the power operation, $T_{poly}^{comp}$ is the first isomorphism map, $T_{comp}^{norm}$ is the second isomorphism map, $T_{norm}^{comp}$ is the third isomorphism map, $T_{comp}^{poly}$ is the fourth isomorphism map, F is the linear part of the affine transform, and $F^{-1}$ is the linear part of the inverse affine transform.

15. The method of claim 3, wherein the second isomorphism map comprises:

9. The method of claim 7, wherein the operating circuit executes an S-box operation which complies with an advanced encryption standard (AES); the operating circuit further comprises an affine transform unit; the method further comprises:
   utilizing the affine transform unit to execute an affine transform upon an output of the multiplicative inverse unit; and the step of designing the multiplicative inverse unit further comprises:
   merging the second isomorphism map, the power operation, and the third isomorphism map to provide a corresponding first transform matrix; and
   merging the fourth isomorphism map and a linear part of the affine transform to provide a corresponding second transform matrix.

10. The method of claim 9, wherein the coefficients $\lambda$ and $\rho$ are chosen according to an equation as follows:

$$(\lambda, \rho) = \arg \min_{\lambda, \rho \in GF(2^4)} w(T_{ploy}^{comp}) + w(T_{norm}^{comp} S T_{comp}^{norm}) + w(F T_{comp}^{poly}) + 4w(\rho),$$

transferring from the polynomial basis over the composite field $GF(2^L)^M$ to the polynomial basis over the specific Galois Field $GF(2^K)$; and transferring from the polynomial basis over the specific Galois Field GF $(2^K)$ to the normal basis over the specific Galois Field $GF(2^K)$.

16. The method of claim 3, wherein the third isomorphism comprises:

transferring from the normal basis over the specific Galois Field $GF(2^K)$ to the polynomial basis over the $GF(2^K)$; and transferring from the polynomial basis over the specific Galois Field $GF(2^K)$ to the polynomial basis over the composite field $GF(2^L)^M$.

17. A processing circuit for dealing with Galois Field computation, comprising:

a multiplicative inverse unit, for deriving a multiplicative inverse of an input data on a specific Galois Field, wherein the multiplicative inverse unit executes at least a plurality of isomorphism maps, and the plurality of isomorphism maps comprises at least a change of basis;

a plurality of selectors for sharing the multiplicative inverse unit for S-Box operations and inverse S-Box operations, wherein coefficients for the multiplicative inverse unit are selected according to a Hamming weight;

an affine transform unit for executing an affine transform upon an output of the multiplicative inverse unit when the operating circuit executes the S-box operation, wherein a first selector is coupled to the output of the affine transform unit; and an inverse affine transform unit for executing an inverse affine transform to generate an input data to the multiplicative inverse unit when the operating circuit executes the inverse S-box operation, wherein a second selector is coupled to the output of the inverse affine transform unit.

18. The processing circuit of claim 17, wherein the change of basis comprises a transformation between a polynomial basis and a normal basis.

19. A method for dealing with Galois Field computation, comprising:

providing an operating circuit which has at least a multiplicative inverse unit; and using the multiplicative inverse unit to execute at least a plurality of isomorphism maps for deriving a multiplicative inverse of an input data on a specific Galois Field, wherein the plurality of isomorphism maps comprise at least a change of basis, wherein providing the operating circuit comprises selecting coefficients of an irreducible polynomial for designing the multiplicative inverse unit, wherein the coefficients are selected according to a Hamming weight, a power operation matrix, and the plurality of isomorphism maps, wherein the irreducible polynomial is $m(x)=x^2+\lambda x+\rho$ and wherein $\lambda$ and $\rho$ are the coefficients of the irreducible polynomial, wherein the plurality of isomorphism maps comprise a first isomorphism map, a second isomorphism map, a third isomorphism map, and a fourth isomorphism map; the first isomorphism map transfers from a polynomial basis over the specific Galois Field $GF(2^K)$ to a polynomial basis over a composite field $GF(2^L)^M$, wherein K=L*M; the second isomorphism map transfers from the polynomial basis over the composite field $GF(2^L)^M$ to a normal basis over the specific Galois Field $GF(2^K)$; the third isomorphism map transfers from the normal basis over the specific Galois Field $GF(2^K)$ to a polynomial basis over the composite field $GF(2^L)^M$; and the fourth isomorphism map transfers from the polynomial basis over the composite field $GF(2^L)^M$ to a polynomial basis over the specific Galois Field $GF(2^K)$, wherein the second isomorphism map comprises:

transferring from the polynomial basis over the composite field $GF(2^L)^M$ to the polynomial basis over the specific Galois Field $GF(2^K)$; and transferring from the polynomial basis over the specific Galois Field GF $(2^K)$ to the normal basis over the specific Galois Field $GF(2^K)$.

* * * * *